United States Patent
Kulkarni et al.

(10) Patent No.: US 12,012,036 B2
(45) Date of Patent: Jun. 18, 2024

(54) STEERING MODULE FOR A MOTOR VEHICLE COMPRISING A DOUBLE-REFLECTIVE LIGHT GUIDE, STEERING DEVICE, AS WELL AS MOTOR VEHICLE

(71) Applicant: Valeo Schalter und Sensoren GmbH, Bietigheim-Bissingen (DE)

(72) Inventors: Vishal Kulkarni, Bietigheim-Bissingen (DE); Peter Mihalka, Bietigheim-Bissingen (DE); Hayk Yepremian, Creteil (FR)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 0 days.

(21) Appl. No.: 18/284,029

(22) PCT Filed: Mar. 24, 2022

(86) PCT No.: PCT/EP2022/057724
§ 371 (c)(1),
(2) Date: Sep. 25, 2023

(87) PCT Pub. No.: WO2022/200480
PCT Pub. Date: Sep. 29, 2022

(65) Prior Publication Data
US 2024/0166125 A1    May 23, 2024

(30) Foreign Application Priority Data

Mar. 25, 2021    (DE) ..................... 10 2021 107 521.1

(51) Int. Cl.
*B60Q 3/283*    (2017.01)
*B60K 35/21*    (2024.01)
*B60Q 3/62*    (2017.01)

(52) U.S. Cl.
CPC ............ *B60Q 3/283* (2017.02); *B60K 35/212* (2024.01); *B60Q 3/62* (2017.02); *B60K 2360/336* (2024.01)

(58) Field of Classification Search
CPC ........ B60Q 3/283; B60Q 2/62; B60K 35/212; B60K 2360/336
(Continued)

(56) References Cited

U.S. PATENT DOCUMENTS 1,782,405 A * 11/1930 Harrison ................ B60K 37/00
362/489
5,203,226 A * 4/1993 Hongou ................... B62D 1/04
74/552

(Continued)

FOREIGN PATENT DOCUMENTS

DE    102017218402 A1    4/2019
DE    102017223719 A1    6/2019
(Continued)

OTHER PUBLICATIONS

International Search Report and Written Opinion in corresponding International Application No. PCT/EP2022/057724, dated Aug. 8, 2022 (9 pages).
German Search Report in corresponding German Application No. 10 2021 107 521.1, dated Aug. 17, 2021 (8 pages).

*Primary Examiner* — Laura K Tso
(74) *Attorney, Agent, or Firm* — Osha Bergman Watanabe & Burton LLP (57) ABSTRACT

The invention relates to a steering module (8) for a motor vehicle (1), the steering module (8) comprising an optical signaling unit (14), which optically indicates an operating state of the motor vehicle (1), wherein the optical signaling unit (14) comprises at least one light source (15) and a light guide (16), by which the light emitted by the light source (15) with a main radiation direction (20) is capable of being (Continued)

deflected in an exit direction which is different from the main radiation direction (20) and the light exits in this exit direction (19) from an emission surface (18) from the light guide (16), wherein the light guide (16) is shaped in such a way that light rays of the coupled-in light are reflected therein at least twice so that the exit direction (19) is opposite to the main radiation direction (20).

15 Claims, 6 Drawing Sheets

(58) Field of Classification Search
USPC .......................................... 362/488, 511, 489
See application file for complete search history.

(56) References Cited

U.S. PATENT DOCUMENTS

| 7,887,222 | B2 * | 2/2011 | Fanfa ..................... | B60K 35/60 |
| | | | | 362/489 |
| 2010/0218641 | A1 * | 9/2010 | Neumann .............. | B60Q 3/283 |
| | | | | 74/552 |
| 2021/0221285 | A1 * | 7/2021 | Kihara ................... | B60K 35/10 |

FOREIGN PATENT DOCUMENTS

| EP | 2937263 | A2 | 10/2015 |
| FR | 3028341 | A1 | 5/2016 |
| WO | 01-19665 | A1 | 3/2001 |
| WO | 2007-084031 | A1 | 7/2007 |

\* cited by examiner

STEERING MODULE FOR A MOTOR VEHICLE COMPRISING A DOUBLE-REFLECTIVE LIGHT GUIDE, STEERING DEVICE, AS WELL AS MOTOR VEHICLE

One aspect of the invention relates to a steering module for a motor vehicle. The steering module comprises an optical signaling unit. Same is intentionally provided for optically indicating an operating state of the motor vehicle. The optical signaling unit comprises at least one light source and one light guide. The light of the light source, which is capable of being emitted by this light source with a main radiation direction, is capable of being deflected by the light guide in an exit direction that is different from the main radiation direction, and in this exit direction this light then exits from the light guide. A further aspect of the invention relates to a motor vehicle with such a steering module.

From the WO 2007/084031 A1 an air-bag unit is known, which may be part of a steering wheel. The air-bag unit comprises a housing, in which a light source and a light guide are arranged. The light of the light source is there emitted by a single reflection in the light guide by an emission surface of the light guide.

Steering modules for motor vehicles are known. They are intentionally installed in a steering device. The steering devices are intended for steering the vehicle by corresponding actuation. A steering device may for instance comprise a steering wheel and/or a steering column. In the case of conventional steering modules a specific operating state can be optically indicated to a driver. In this regard, however, only designs are known in which the light guides are relatively large and therefore the signaling unit has a corresponding space requirement. Moreover, due to this fact it is only possible to a limited degree to optically indicate comprehensive light information. This relates to specific exit directions of the light and thus its unlimited perceptibility.

It is the object of the present invention to provide a steering module, a steering device, and a motor vehicle, in which the optical signaling of an operating state is improved and a compact setup of the steering module is facilitated.

This object is solved by a steering module, a steering device, and a motor vehicle according to the independent claims.

One aspect of the invention relates to a steering module for a motor vehicle. The steering module is provided in particular for installation in a steering device. The steering module thus is intentionally provided for this function. The steering module comprises an optical signaling unit. Same is intentionally provided to optically indicate or correspondingly optically signal, respectively, at least one operating state of the motor vehicle. The optical signaling unit moreover comprises at least one light source. The optical signaling unit moreover comprises at least one light guide, by which the light, which is emitted from the light source with a main radiation direction, is capable of being deflected into an exit direction that is different from the main radiation direction. In this exit direction the light exits from the light guide. For this purpose the light exits from an emission surface of the light guide. The light guide is defined to be shaped in such a way that light rays of the coupled-in light are reflected therein at least twice. This is the case to the effect that the exit direction of the light exiting from the emission surface of the light guide is opposite to the main radiation direction. Thus, it is possible that a particularly compact setup of the optical signaling unit is facilitated. This, in turn, results in a compact setup of the steering module. In particular, this is achieved by using a space-saving light guide, which due to its predetermined shape moreover also allows for a multiple coupling of the light in the light guide. Also the desired relatively strong change in direction between the main radiation unit and the exit direction can thereby be facilitated. Light, which thus is emitted with the main radiation direction, can thus be emitted in the opposite from the optical signaling unit by this compact light guide. By such a setup thus an extreme change of direction between main radiation direction and exit direction can be achieved. By the intentionally provided at least double reflection of light rays also the exit direction can be generated in a way opposite to the main radiation direction as particularly advantageous light direction. Thus, it is also facilitated that the main radiation direction in an embodiment is facing away from a front face or a front side of the steering module and the exit direction is facing this front face. This is particularly advantageous when the steering module with its front face in the installed state in the motor vehicle is facing the driver of the vehicle. This is because then by this design it is facilitated that the main radiation direction, to start with, is facing away from the driver of the vehicle and by this specific design of the invention the exit direction then is facing the driver of the vehicle. Thus, in a compact setup in a simple way it can be achieved that the light exiting from the emission surface of the light guide intentionally is emitted by the steering module towards the vehicle driver. The particularly simple and intuitive perception of the optical signaling is thereby rendered possible. The front side or the front face of the steering module therefore is intentionally that side which in an intentional installation of the steering module in a steering device is facing the driver of the vehicle. In particular it is facing to the face of the vehicle driver or is located closer than a rear side or reverse side of the steering module. In particular the exit direction in the installed state of the steering module in a steering device is facing a front face or a front side of the steering device. This front face intentionally is facing the vehicle driver, in particular its face. It is in this regard closer to the face than a reverse side of the steering device. The front side and the reverse side are viewed along a longitudinal axis of the steering device and in particular represent opposite end portions.

According to an embodiment the light guide in cross section has the shape of a U, in particular an asymmetrical U. The sectional plane in this connection is in particular arranged in such a way that the exit direction and/or the main radiation direction lie completely in the sectional plane. By this specific shape the light guide has a correspondingly strong curvature. In particular by this very strongly curved shape it has two reflection surfaces, which are arranged in a corresponding angle relative to each other and which allow for changing the light rays in the at least double reflection from the main radiation direction into the exit direction so that these are opposite to one another.

By this specific shape of the light guide same is of a correspondingly compact setup so that it can be installed in a space-saving way.

In an embodiment an angle between the main radiation direction and the exit direction is larger than 150°. In particular this angle amounts to between 150° and 210°. In an embodiment this angle amounts to between 175° and 185°. These values specify the being opposite to one another in an individual way. Opposite thus means not solely the change by 180°.

In an embodiment an internal angle between the main radiation direction and the exit direction amounts to maximally 45°. In particular the internal angle amounts to between 0° and 35°, in particular between 0° and 20°, in particular between 0° and 5°. Thereby, a light ray is deflected very strongly by the at least double reflection, however, not necessarily only by 180°.

In an embodiment the exit direction is directed towards a front face or a front side of the steering module. Thus, also the emission surface of the light guide is directed towards this front face or towards this front side of the steering module. In particular this emission surface is exposed towards the front face or the front side of the steering module. Thus, light exiting from the emission surface with the exit direction can be radiated towards this front side of the steering module. By this design the optical signaling of the operating state is particularly easily perceivable by a driver. Thus, also improved safety requirements can be met since a vehicle driver then can also intuitively easily recognize and perceive this optical signal. Thus, also an easy comprehension of the current operating state of the motor vehicle is involved. The driver of the vehicle therefore need not perform any multiple movements or comprehensive changes in viewing direction in order to be able to perceive such optical signaling of an operating state.

In an embodiment the optical signaling unit has a diffusor structure. By same intentionally the light exiting from the light guide can be diffused. Thus, the optical appearance can be presented as homogenous light surface. In particular, when the emission surface is designed to be correspondingly larger and for instance configured to be stripe-shaped, by this diffusor structure the light emission can be designed to be homogenous across the entire emission surface. Thus, also a larger and more uniform optical signaling information can be provided. For instance also as light-band.

In an embodiment the diffusor structure is formed by a component that is separate from the light guide. This diffusor structure can then be arranged spaced apart from the emission surface of the light guide or directly contacting it.

In a further embodiment the diffusor structure is integrally formed in the emission surface of the light guide, at which the light exits from the light guide. For instance, the diffusor structure can also be configured as etching or graining in this emission surface. However, it is also possible to achieve other kinds of structuring of this emission surface in order to then produce this diffusor effect integrated in the emission surface.

In an embodiment the optical signaling unit has a micro optics component. Same is arranged in the optical path of the light after the light guide. Also thereby individual imaging properties can be generated. This facilitates a higher flexibility of the optical signaling effect.

Not only thereby, but also by the above-named other embodiments, it is possible that a continuous, homogenous light band is generated as light image. In this regard, the emission surface can be shaped accordingly. For instance, this emission surface can be realized as a stripe that is curved in one direction. For instance, here a banana shape may be formed. This is advantageous in the case of an arrangement on a top surface of a center module of a steering device. In this exposed position the light emission is particularly easily perceivable by a vehicle driver.

In an embodiment the outer surface of the light guide is provided at least in portions with an opaque material. For instance, here an imprint or other design may be provided. Thus, loss of light leaking in undesired places from the light guide can be avoided. Possible is here for instance a coating in black. Also, a corresponding application of color on this outer surface of the light guide can be configured. Equally, however, a separate envelope is possible.

In an embodiment the optical signaling unit comprises several light sources. For instance more than five light-emitting diodes may be provided. The light guide may be made of glass or a plastic material. For instance the plastic material may be polycarbonate or PMMA.

In an embodiment the optical signaling unit comprises at least one circuit board. Thereon the light sources of the optical signaling unit are arranged. Moreover, on this same circuit board also the driver electronics for the light sources can be arranged.

In an embodiment the steering module in addition to this circuit board may comprise a further, separate circuit board. Thereon, electronic components for a steering wheel of a steering device may be arranged. This may then also be a main circuit board of the steering module. In an embodiment these two separate circuit boards may be connected with each other.

In a further preferred embodiment it is also possible that these two circuit boards are replaced by a single, common circuit board. In such an embodiment the steering module then comprises only a single circuit board, on which the light-emitting diodes are arranged for generating the light for the optical signaling unit, the driver electronics for these light-emitting diodes is arranged thereon, and moreover also the electronics for a steering wheel of a steering device is arranged thereon. In this regard, then also a steering wheel switch electronics can be installed on this circuit board. For instance such a single circuit board can be assembled double-sided. This can for instance be effected by an SMD process (Surface Mounted Device Process). In this connection it is then possible that the light-emitting diodes of the optical signaling unit are arranged on one side of the circuit board and the named electronic components are arranged on the other side of the circuit board. Also thereby a compact setup of the steering module is facilitated. In particular it is thereby also facilitated to orientate the main radiation direction of these light-emitting diodes towards a rear face or a reverse side of the steering module and thereby to be capable of orientating the exit direction by the at least double-reflecting light guide to be opposite thereto. Thereby, a highly compact and integrated arrangement is facilitated.

In a further embodiment the steering module comprises a capturing unit for capturing the brightness of the environment of the steering module. Thus, advantageously an additional function is integrated into the steering module. Thus, it is not only configured for optical signaling of an operating state of the motor vehicle but can moreover also determine the brightness in the environment of the steering module. By the design of the steering module with the signaling unit having a compact setup the realization of this additional function is facilitated. This is because thereby also the corresponding components, which are required for this capturing unit for capturing the brightness of the environment, can be equally installed in the steering module in a space-saving way.

In an embodiment the capturing unit comprises at least one light guide, by which the light in the environment can be guided to a detector of the capturing unit. Thereby an advantageous determination of the environmental brightness is facilitated. Since by such light guide the incident light can be guided comprehensively and directly with relatively small losses to the detector of the capturing unit, thus also an accurate determination of the environmental brightness is facilitated. Moreover, thereby the detector can be further installed in the interior of the steering module, while sufficient light still reaches the detector. In particular, the detector then can also be installed on the circuit board on which the other above-named components are arranged. A separate circuit board for the components of the capturing unit is then not required.

In this connection it is also possible that the light guide of the capturing unit is separate from the light guide of the optical signaling unit. In a further embodiment, however, it may also be envisaged that the light guide of this capturing unit is the one that is associated with the optical signaling unit. Thus, by a single light guide both light for emitting from the steering module as well as light incident from the environment can be guided into the steering module. In this regard it is thus also possible to facilitate a bidirectional guiding of light in such an embodiment.

In an embodiment it may also be envisaged that the electronics of the capturing unit for capturing the environmental brightness is arranged at least proportionately on the circuit board, on which also components of the optical signaling unit and/or the steering wheel electronics are arranged. Also thereby the degree of integration can be raised.

In an embodiment an incidence surface of the light guide of the capturing unit for capturing the environmental brightness is arranged adjacent to the emission surface of the light guide of the optical signaling unit. In this connection it is possible that the capturing unit comprises two light guides, which can capture the environmental brightness in two different places on the steering module. For instance it may be envisaged that if the emission surface of a light guide of the optical signaling unit is configured as, in particular curved, stripe, these two separate incidence surfaces of the light guide or of the light guides, respectively, of the capturing unit for capturing the environmental brightness are arranged adjacent to the ends of this stripe of the emission surface. Also thereby a compact setup is achieved. For instance an incidence window may be a transparent portion of a housing of the steering module. This is in particular advantageous, if the at least one light guide of the capturing unit for capturing the environmental brightness is installed in this housing and cannot be immediately arranged to be exposed towards the outside. Thereby, in such a design the light through this transparent window in the housing can then directly reach the light guide of the capturing unit. However, it is also possible that in this housing a hole is formed and in this hole or directly behind it the incidence surface of the light guide is arranged. In this regard this incidence surface then is no longer additionally covered towards the outside. The light can then be incident directly upon the incidence surface of the light guide of the capturing unit. It is also possible that the light guide of the capturing unit is shaped in such a way that the incident light is reflected at least once and is guided to the detector of the capturing unit. Particularly advantageously is this function of environmental brightness measuring to the effect that depending on this environmental brightness the intensity of the light from the light sources of the optical signaling unit can be controlled. Thus, it is also achieved that the optical signaling can be controlled by the optical signaling unit depending on the environmental brightness. Thus, this optical signaling can be individually brighter or darker, depending on which environmental brightness is currently prevailing. The perceptibility of the optical signal of the optical signaling unit is then possible without limitation in various environmental brightnesses.

By the above-named immediately adjacent arrangement of the incidence surface of the at least one light guide of the capturing unit relative to the emission surface of the light guide of the optical signaling unit this control of the light emission of the optical signaling unit can be effected particularly precisely in dependence on the environmental brightness. This is because then very exactly in the place in which the emission surface of the light guide is arranged, also the environmental brightness can be captured.

A further aspect of the invention relates to a steering device for a motor vehicle. The steering device comprises a steering wheel and a steering column. The steering device moreover comprises a steering module according to the above-named aspect or an advantageous embodiment thereof. In an embodiment the steering module is arranged on the steering wheel. In another embodiment the steering module, however, can also be arranged on the steering column.

A further aspect of the invention relates to a motor vehicle comprising a steering device according to the above-named aspect. The exit direction of the light from the light guide of the optical signaling unit is oriented in the direction of a driver seat of the motor vehicle. Thus, the emission surface of this light guide of the optical signaling unit is arranged to face the driver seat. Light emitted from this emission surface thus is radiated in the direction of the driver seat, in particular the backrest of the driver seat.

In an embodiment as operating state of the motor vehicle for instance an emergency brake assistant of the motor vehicle can be indicated. It is also possible that by this optical signaling unit a driving mode of the motor vehicle is indicated. In particular this applies to a driving mode with respect to an autonomy level of the motor vehicle. For instance if the motor vehicle is capable of being operated at least partially autonomously as autonomy level it has for instance level 2 or level 3 or level 4. At least one of these possible, at least partially autonomous operating states in this regard can be optically signaled.

Embodiments of the invention are shown in more detail in the following with reference to schematic drawings. These show in.

In the figures same elements or elements having the same function are equipped with the same reference signs.

Figure 1:
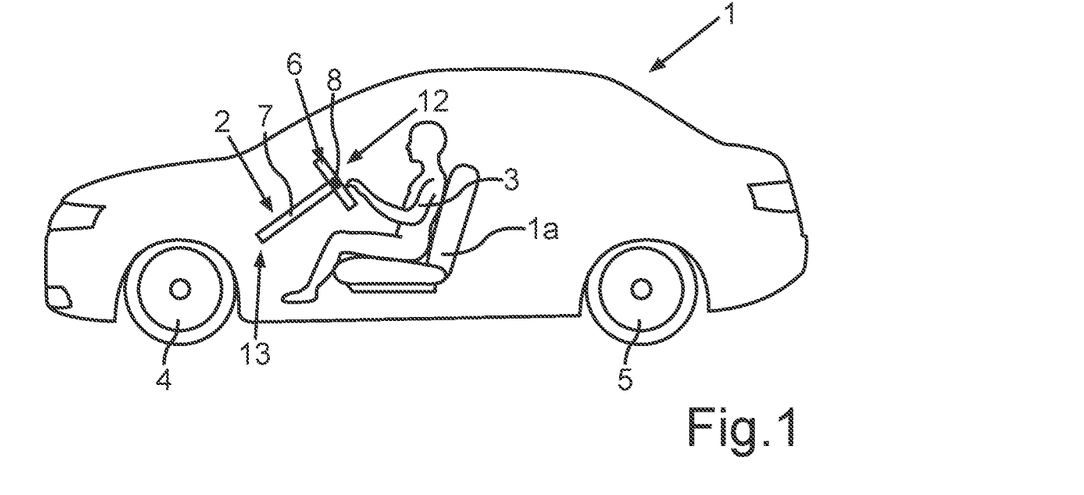
FIG. 1 a schematic view of an embodiment of a motor vehicle with an embodiment of a steering device according to the invention.

In FIG. 1 in a schematic view a motor vehicle 1 is shown. The motor vehicle 1 may for instance be a passenger car. The motor vehicle 1 in the shown embodiment comprises a steering device 2. By the steering device 2 the motor vehicle 1 can be steered. In particular a vehicle driver 3 may actuate the steering device 2. Thereby, front wheels 4 of the motor vehicle 1 can be steered. It is also possible that in addition thereto rear wheels of the motor vehicle 1 can be steered. The steering device 2 in an embodiment may comprise a steering wheel 6. In an embodiment the steering device 2 may comprise a steering column 7. Moreover, the steering device 2 may comprise a steering module 8. The steering module 8 may for instance be integral part of the steering wheel 6. In a further embodiment the steering module 8 may be integral part of the steering column 7.

Figure 2:
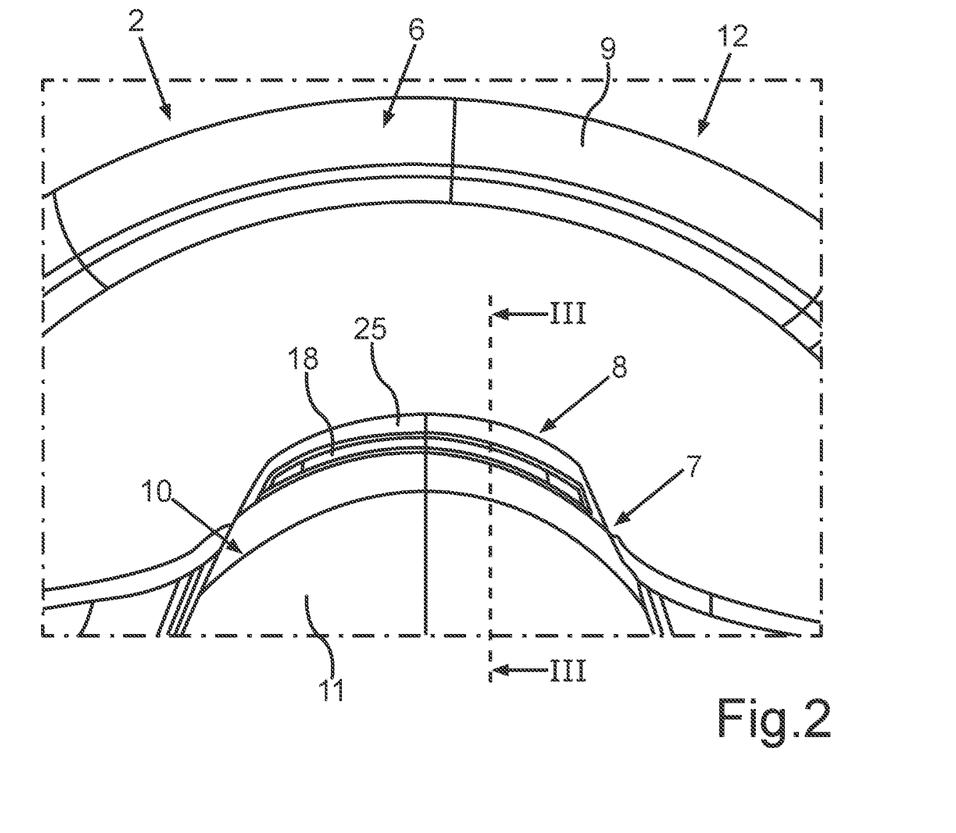
FIG. 2 a partial view of an embodiment of a steering device with a view of a front face of an embodiment of a steering module according to the invention.

In FIG. 2 in a partial view components of the steering device 2 are shown. Here subcomponents of the steering wheel 6 and the steering column 7 are shown. The steering wheel 6 may for instance comprise a ring 9, which can be directly gripped by the vehicle driver 3. Moreover, the steering wheel 6 may comprise a steering wheel spoke 10 with a center module 11. In an embodiment in the center module 11 the steering module 8 may be arranged.

As can be discerned in FIG. 1, the steering device 2 and thus the steering module 8 has a front face or a front side 12, respectively. In the installed state in the motor vehicle 1, as this is shown in FIG. 1, this front side 12 intentionally is envisaged to face the vehicle driver 3, in particular his face, in particular, when same is sitting on a driver seat 1*a*. A rear face 13 in this regard is intentionally envisaged to face away from the vehicle driver 3, in particular from his face, in the installed state of the steering device 2 in the motor vehicle 1.

In FIG. 2 the view of the steering device 2 looking at the front face 12 or front side, respectively, is shown. Consequently, a view is shown, in which the vehicle driver 3 in the viewing direction looks towards the front at the steering device 2.

Figure 3:
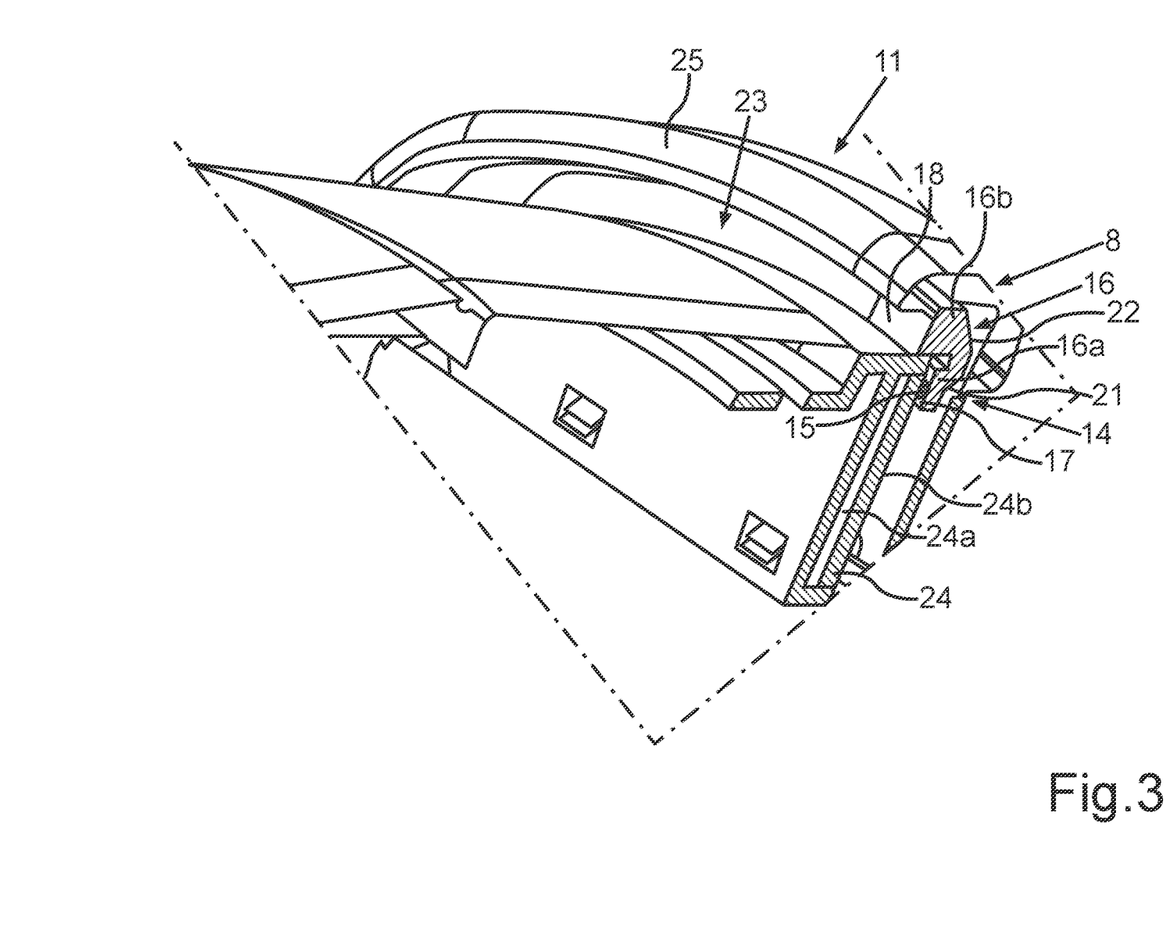
FIG. 3 a perspective sectional view for a part of the arrangement in FIG. 2.

In FIG. 3 in a perspective sectional view the steering device 2 along the section line III-Ill, as it is shown in FIG. 2, is shown. Thus, here a section through the center module 11 is shown. As can be discerned here, the steering module 8 comprises an optical signaling unit 14. Same intentionally is provided for optically indicating an operating state of the motor vehicle 1. The optical signaling unit 14 comprises at least one light source 15. Same may be a light-emitting diode. Preferably several corresponding light sources, for instance eight, are present. Moreover, the optical signaling unit 14 comprises a light guide 16. Light, which is emitted from the light source 15, is coupled in at an incidence surface 17 of the light guide 16 into this light guide 16. The light guide 16 is consciously shaped and designed in such a way that this coupled-in light is reflected at least twice in the light guide 16 itself. This is the case to the effect that this reflected light exits at an emission surface 18 of the light guide 16 in an exit direction 19 (FIG. 4), which is opposite to a main radiation direction 20 (FIG. 4) of the light source 15 or the entry direction on the incidence surface 17.

As can be further discerned in FIG. 2, this emission surface 18 faces the front face 12. As can be recognized in FIG. 1 and FIG. 2 in this connection, the light exiting from the emission surface 18 thus is emitted towards the vehicle driver 3, in particular his face. This emission surface 18 thus also faces the vehicle driver 3. The vehicle driver 3 can directly view this emission surface 18 when sitting on the driver seat 1*a* of the motor vehicle 1.

As can moreover be recognized in FIG. 3, the light guide 16 in its cross-sectional view, as it is shown in FIG. 3, in an embodiment has a U-shape. The U-shape here is in particular asymmetrical. The U-leg 16*a* comprising the incidence surface 17 in this regard is shorter than the further U-leg 16*b* comprising the emission surface 18. In particular this is to be understood in the direction towards the front face 12.

For generating the correspondingly defined double reflection reflecting the light with the main radiation direction 20 into the opposite exit direction 19 this here is achieved by reflection surfaces 21 and 22, which are very specifically configured and oriented relative to each other. In particular in the embodiment in this regard a corresponding double reflection is only provided by such a main ray of the light. In the embodiment it can be recognized that an internal angle between the main radiation direction 20 and the exit direction 19 amounts to maximally 45°. In particular this internal angle amounts to between 0° and 35°; in particular between 0° and 20. In the embodiment according to FIG. 4 this angle amounts to between 0° and 5°. This means that the light ray having a main radiation direction 20 is inverted by the double reflection in the light guide 16 quasi by 180°.

The optical signaling unit 14 due to the named components is configured to be also very compact and smart with regard to the guiding of light. A reverting or inverting of the direction of light can be achieved by a very compact setup.

In an embodiment the light guide 16 may in particular have a diffusor structure 23 on its emission surface 18. The diffusor structure 23 may be a separate component arranged correspondingly on the front side of the light guide 16. By the diffusor structure 23 the diffusing of the light exiting from the light guide 16 is specifically facilitated. In a further embodiment it may be envisaged that this diffusor structure 23 is integrated into the light guide 16. For instance in this connection the emission surface 18 may be structured correspondingly. For instance here an etching or graining of this emission surface 18 may have been effected. In a further embodiment it is possible that the optical signaling unit 14 has a micro optics component. Same is arranged in the optical path of the light after the light guide 16.

Figure 4:
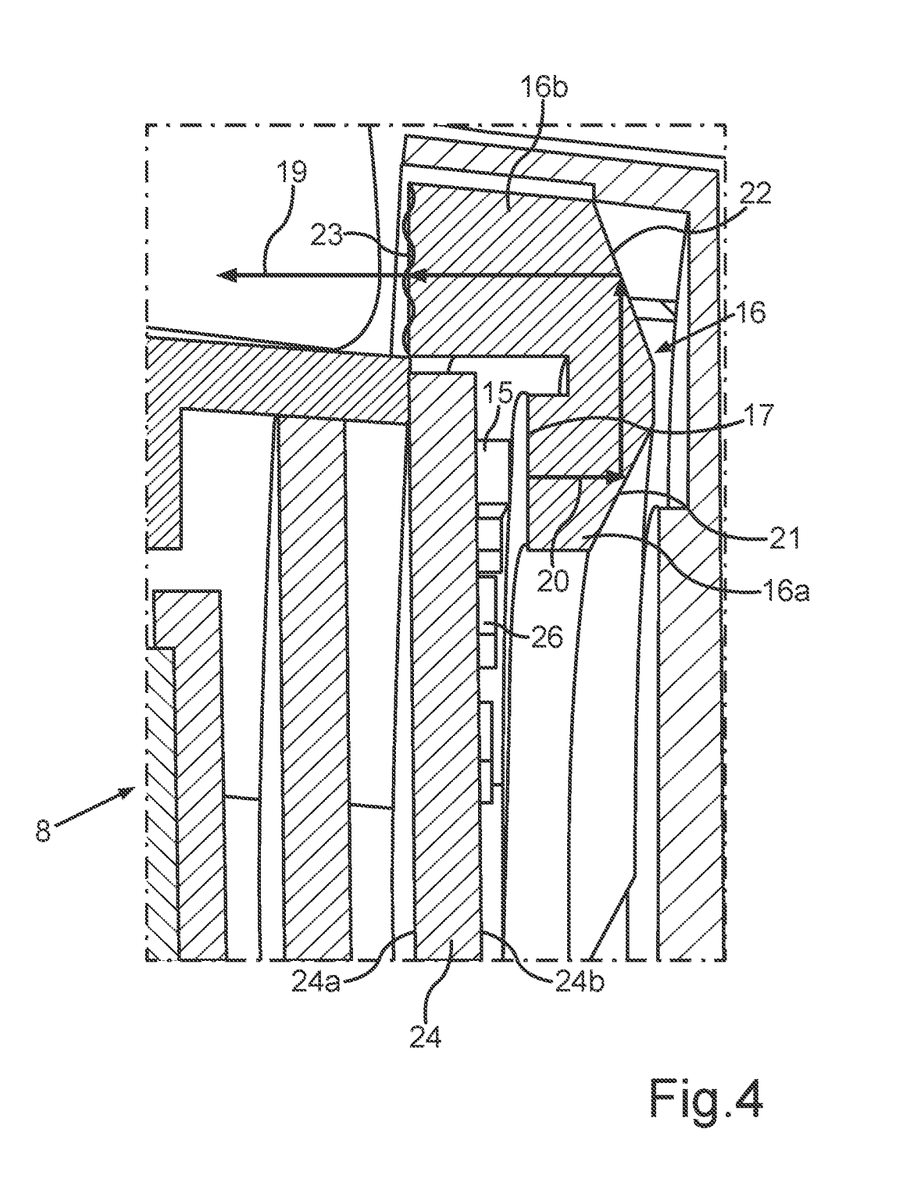
FIG. 4 an enlarged sectional view of a part of the embodiment in FIG. 3.

As can be discerned in FIG. 3 and FIG. 4, the optical signaling unit 14 has a circuit board 24. The circuit board 24 has a front face 24*a* facing the front side 12. It moreover has a rear face 24*b* facing away from the front side 12. In the embodiment the at least one light source 15 is arranged on this rear face 24*b*. Light in this embodiment thus is radiated backwards and thus quasi towards the reverse side 13 of the steering device 2.

It may be envisaged that the optical signaling unit 14 comprises several light sources 15, for instance more than five light sources, for instance eight light sources.

It is possible that the steering module 8 has several circuit boards. In this way on a circuit board, for instance the circuit board 24, the array of the light sources 15 as well as electronics of the optical signaling unit 14 can be arranged. For instance this may be a driver electronics for the light sources 15.

On a further circuit board that is separate therefrom further electronics of the steering module 8 can be arranged. For instance this may be electronics for further functional units of the steering wheel 6.

At a preferred embodiment it may be envisaged that the steering module 8 comprises only a single circuit board 24. Thereon then all electronic components, on the one hand, and light sources 15, on the other hand, may be arranged. In this regard, electronic components can be arranged on the front face 24*a* and/or on the rear face 24*b*.

As can also be discerned in FIG. 2, the emission surface 18 is configured as stripes. In particular as curved stripes.

The housing of the center module 11 has a roof-like protrusion 25. By this protrusion 25 also a kind of light tunnel or light channel is formed. The light exiting from the emission surface 18 thereby is perceivable even better. Moreover, by the protrusion 25 also an improved protection against environmental light incident upon the emission surface 18 is achieved. Thereby for instance in the case of strong incident sunlight it can be avoided that the perceptibility of the light exiting from the emission surface 18 would be limited.

In FIG. 4 a view of the components in FIG. 3 is shown, however, only in the sectional representation. Moreover, a part of the section plane in FIG. 3 and FIG. 4 is shown enlarged. In this regard also exemplary electronic components 26 are shown, which are applied to the circuit board 24, in particular the rear face 24*b*.

Figure 5:
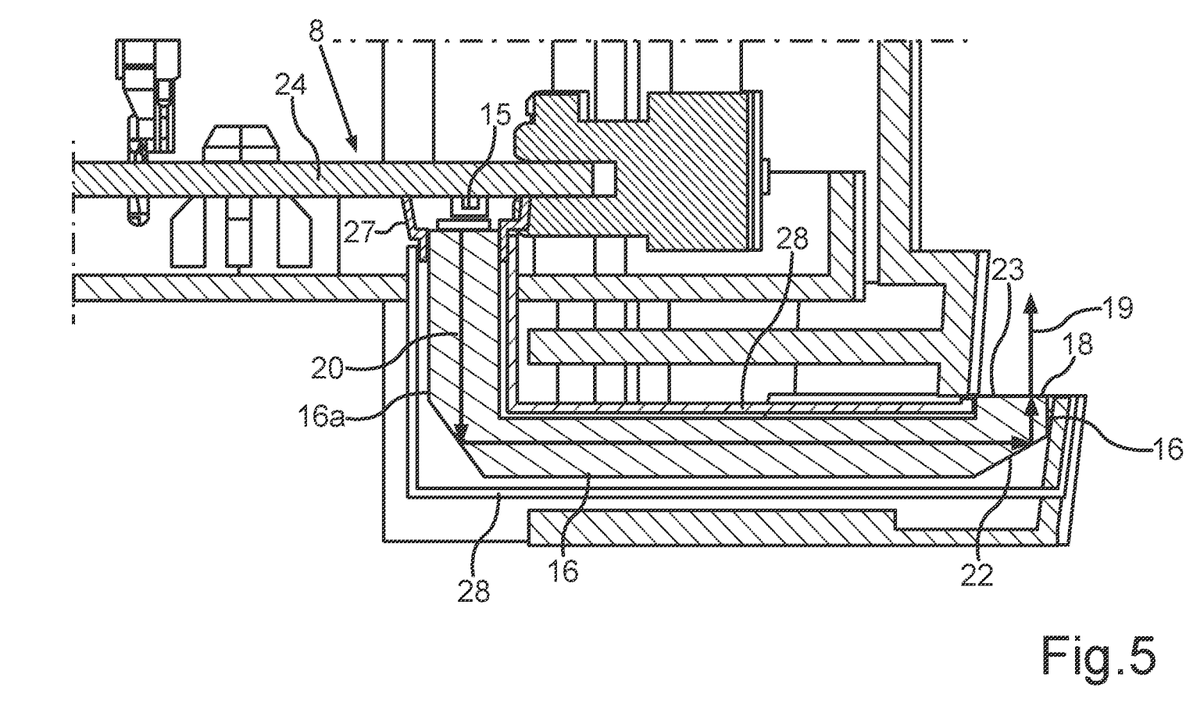
FIG. 5 a further sectional view of an embodiment of a steering module according to the invention.

In FIG. 5 a sectional view of a further embodiment of a steering module 8 is shown. Here an embodiment with a single circuit board 24 is illustrated. The light source 15, the light guide 16, and further components are here drawn merely symbolically and schematically. In particular here also symbolically a holder 27 for the light guide 16 is shown. In an embodiment the light guide 16 externally is equipped with a cover 28 at least in portions.

The cover 28 may be a separate component, such as a sleeve. It may, however, also be applied directly to the outer surface of the light guide 16. For instance this may be an imprint or coating or coloured painting. Thereby it is achieved that light from the light guide 16 does not otherwise leak in an undesired way from the light guide 16 on the path from the incidence surface 17 to the emission surface 18. For instance this cover 28 may be black. For instance this may be a black paint or a black imprint.

For instance this circuit board 24 in terms of mounting may be a PCBA (Printed Circuit Board Assembly).

In the embodiment in FIG. 5 in the cross-sectional view equally an asymmetrical U-shape of the light guide 16 is formed. Here, however, the leg 16*a* facing the light source 15 is the longer one and the leg 16*b* facing away from the light source 15 is the shorter one.

It is also possible that the light guide 16 in an embodiment in a cross-sectional view has an L-shape. A central recess, as it is formed between the legs 16*a* and 16*b* and is typical of a U, then is not formed.

Such light guide 16 then intentionally has a shape, which at least allows for a double reflection of the light in the light guide 16 to the effect that the light coupled-in in a main radiation direction 20 into the light guide 16 via the incidence surface 17 exits at the emission surface 18 in a direction opposite thereto.

Figure 6:
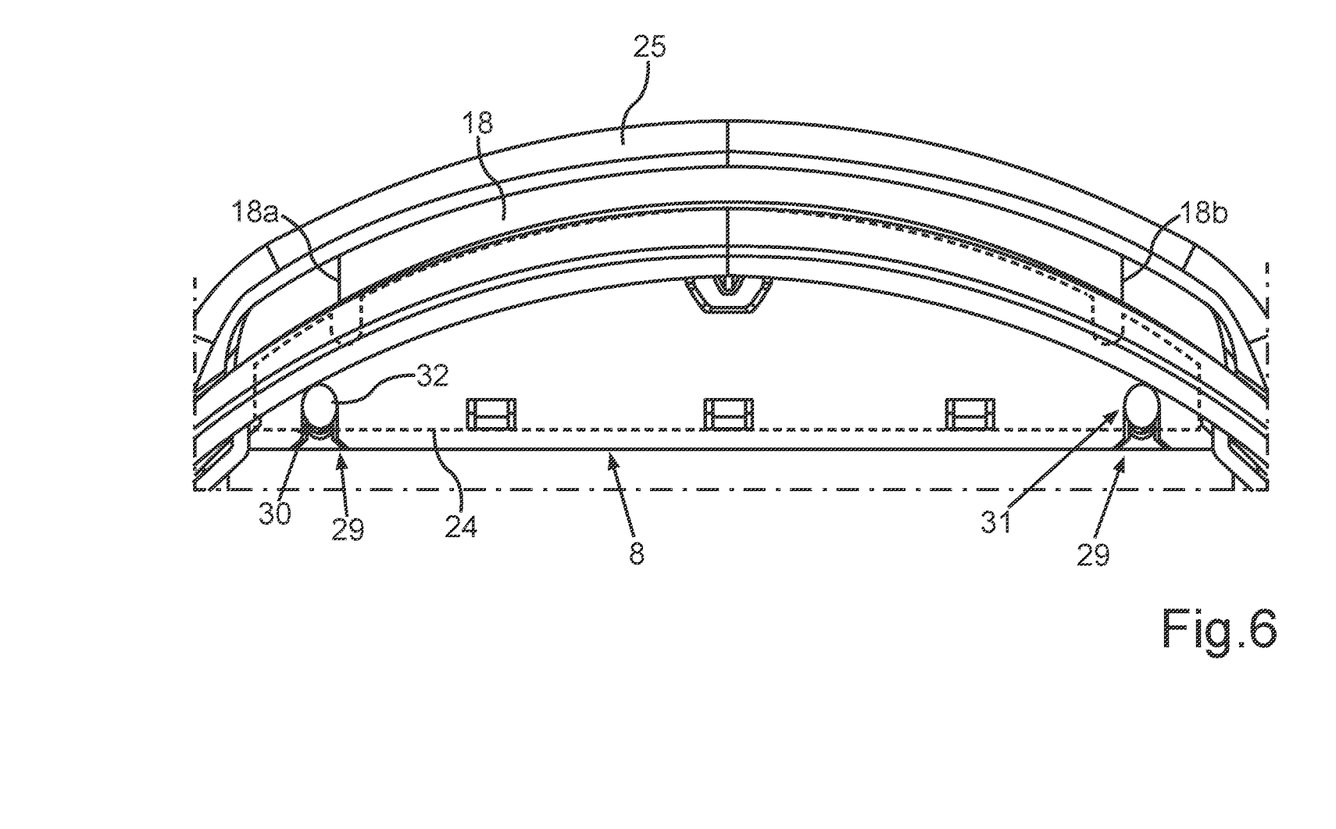
FIG. 6 an enlarged view of a portion of the arrangement in FIG. 2.

In FIG. 6 an enlarged view of the part of the center module 11 is shown, wherein here that portion is shown enlarged, in which the emission surface 18 of the light guide 16 is illustrated.

In an embodiment the steering module 8 in addition to the optical signaling unit 14 comprises a capturing unit 29, which is intentionally configured for capturing the brightness of the environment of the steering module 8. This means that by this capturing unit 29 the brightness of the environment of the steering device 2 is to be detected. In the embodiment this capturing unit 29 comprises at least one light guide 30. In the embodiment two light guides 30 and 31 are provided. In this regard in FIG. 7 a perspective view of parts of the capturing unit 29 are represented. The design of the light guide 30 is here shown. Same has an incidence surface 32. The incidence surface 32 may be exposed towards the environment. However, it may also be envisaged that a housing of the steering module 8 has a transparent window, behind which the incidence surface 32 is arranged.

Light which is incident from the environment upon this incidence surface 32, is guided by this light guide 30 to a detector 33 (FIG. 7) of the capturing unit 29. By this detector 33, which may for instance be a photo diode, then the environmental brightness is detected. The same may be correspondingly envisaged by the preferably present additional light guide 31.

In the embodiment the two light guides 30 and 31 are arranged immediately adjacent to the emission surface 18. Moreover, they are arranged in the direction of the longitudinal axis of the stripe-shaped emission surface 18 in the area of the opposite ends 18*a*, 18*b* of this stripe-shaped emission surface 18. This has advantages with regard capturing the environmental brightness as uniformly as possible. Thereby it may also be recognized whether quasi along the emission surface 18 there are different environmental brightnesses given. Thus, a particularly advantageous control of the light sources 15 may be effected in dependence on this environmental brightness. A radiation of the light that is too dark or too bright, in particular from the emission surface 18, can thereby be avoided.

A circuit board 34 of the capturing unit 29 comprises the detector 33. Moreover, also further components may be arranged thereon, for instance a plug connector 35. It may be envisaged that the circuit board 34 is a circuit board that is separate from the circuit board 24. However, it is also possible that these components of the capturing unit 29 are arranged on the single common circuit board 24. Then the circuit board 34 can be omitted.

Figure 7:
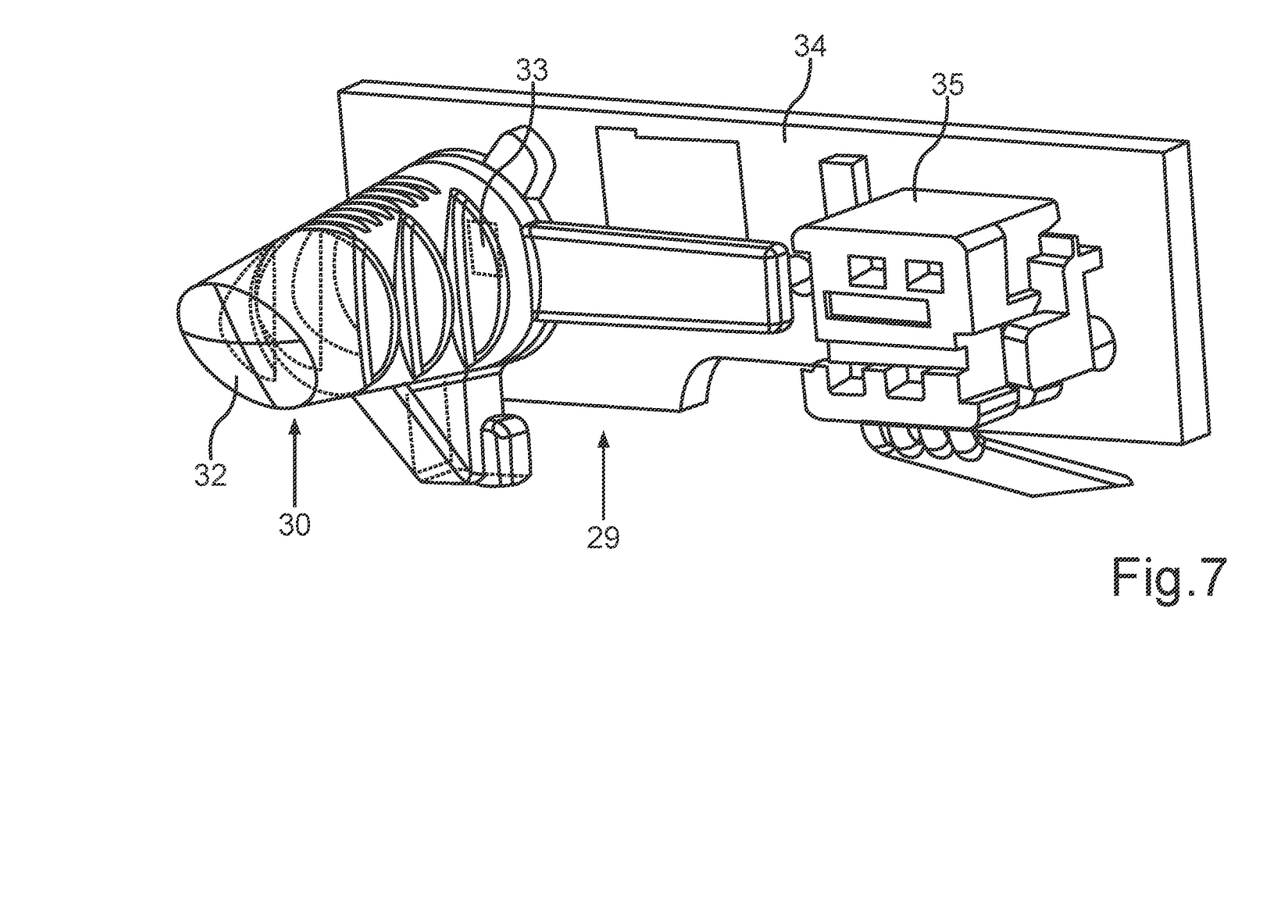
FIG. 7 a perspective view of partial components of a capturing unit for capturing the environmental brightness forming integral part of the steering module.

In FIG. 7 the light guide 30 also has a bar-like protrusion extending in the direction of the plug 35. This bar serves in particular for fastening to the circuit board 34.

The invention claimed is:

1. A steering module for a motor vehicle, the steering module comprising an optical signaling unit, which optically indicates an operating state of the motor vehicle,
wherein the optical signaling unit comprises at least one light source and a light guide, by which the light emitted by the light source with a main radiation direction is capable of being deflected in an exit direction which is different from the main radiation direction and the light exits in this exit direction from an emission surface from the light guide,
wherein the light guide is shaped in such a way that light rays of the coupled-in light are reflected therein at least twice so that the exit direction is opposite to the main radiation direction.

2. The steering module according to claim 1,
wherein the light guide in cross section is configured as U or L and has two reflection surfaces, through which the double reflection in the light guide is affected.

3. The steering module according to claim 1,
wherein an internal angle between the main radiation direction and the exit direction amounts to maximally 45°.

4. The steering module according to claim 1,
wherein the exit direction from the emission surface is directed towards a front face of the steering module.

5. The steering module according to claim 1,
wherein the optical signaling unit has a diffusor structure, by which the light exiting from the light guide is diffused.

6. The steering module according to claim 5,
wherein the diffusor structure is formed by a component that is separate from the light guide.

7. The steering module according to claim 5,
wherein the diffusor structure is configured to be integrated in an emission surface of the light guide, at which the light exits from the light guide.

8. The steering module according to claim 7,
wherein the diffusor structure is configured as etching or graining on the emission surface.
9. The steering module according to claim 1,
wherein the optical signaling unit has a micro optics component, which is arranged in the optical path of the light after the light guide.
10. The steering module according to claim 1,
wherein the steering module comprises a capturing unit for capturing the brightness of the environment of the steering module.
11. The steering module according to claim 10,
wherein the capturing unit comprises a light guide, by which the light of the environment is guided to a detector of the capturing unit.
12. The steering module according to claim 11,
wherein the light guide is the one of the optical signaling unit or a light guide that is separate therefrom.
13. The steering module according to claim 1,
wherein the steering module comprises a common circuit board, on which the at least one light source, electronic components of the optical signaling unit and electronic components of further function units of a steering wheel of the motor vehicle are arranged.
14. A steering device comprising:
a steering wheel;
a steering column;
a steering module according to claim 1,
wherein the steering module is arranged on the steering wheel or on the steering column.
15. A motor vehicle comprising a steering device according to claim 14,
wherein the exit direction is oriented in the direction of a driver seat of the motor vehicle.

* * * * *